United States Patent [15] 3,676,989
Slayton [45] July 18, 1972

[54] ELECTRIC GRASS EDGER

[72] Inventor: John W. Slayton, 2148 Stanford Ave., Pomona, Calif. 91766

[22] Filed: March 15, 1971

[21] Appl. No.: 124,167

[52] U.S. Cl. ................................56/10.5, 56/11.9, 56/17.1
[51] Int. Cl. ........................................................A01g 3/06
[58] Field of Search ..................56/11.9, 10.5, 16.9, 17.1, 56/17.2, 17.5, 256

[56] References Cited

UNITED STATES PATENTS

| | | | |
|---|---|---|---|
| 2,855,742 | 10/1958 | Cooper et al. | 56/16.9 X |
| 2,938,323 | 5/1960 | Livingston et al. | 56/16.9 |
| 3,210,494 | 10/1965 | Murdock | 200/61.19 |
| 2,721,432 | 10/1955 | Machovec | 56/17.1 |
| 2,909,885 | 10/1959 | Smith | 56/11.9 |

*Primary Examiner*—Louis G. Mancene
*Assistant Examiner*—J. N. Eskovitz
*Attorney*—Wm. Jacquet Gribble

[57] ABSTRACT

A pusher-handle attaches to a frame which supports a battery and has a rear wheel pair and a vertically articulated front wheel pair to change the height of a cutter blade driven by a DC series-wound motor supported from the frame. The motor is displaceable angularly with respect to the frame by means of a rectangle of interconnecting telescoping and turning links. Controls at the handle set the height of the motor and the blade and set the tilt of the blade. The controls are locked by threaded members which thrust against clutch plates. The battery has a keyed switch.

6 Claims, 7 Drawing Figures

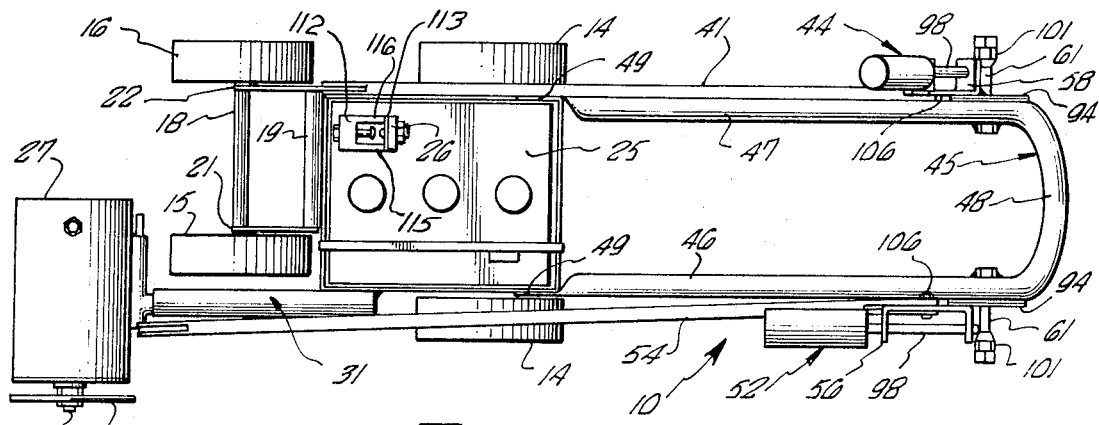
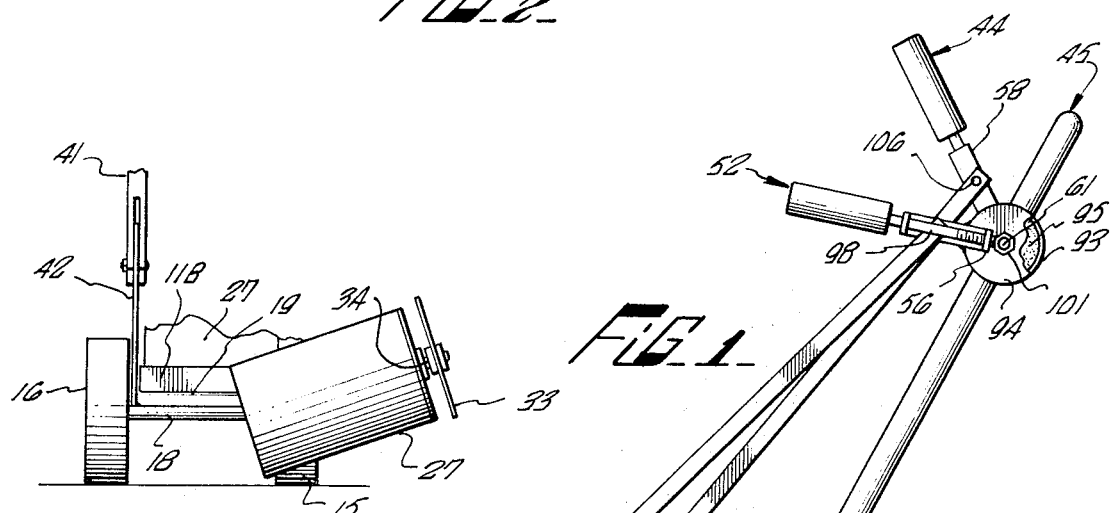
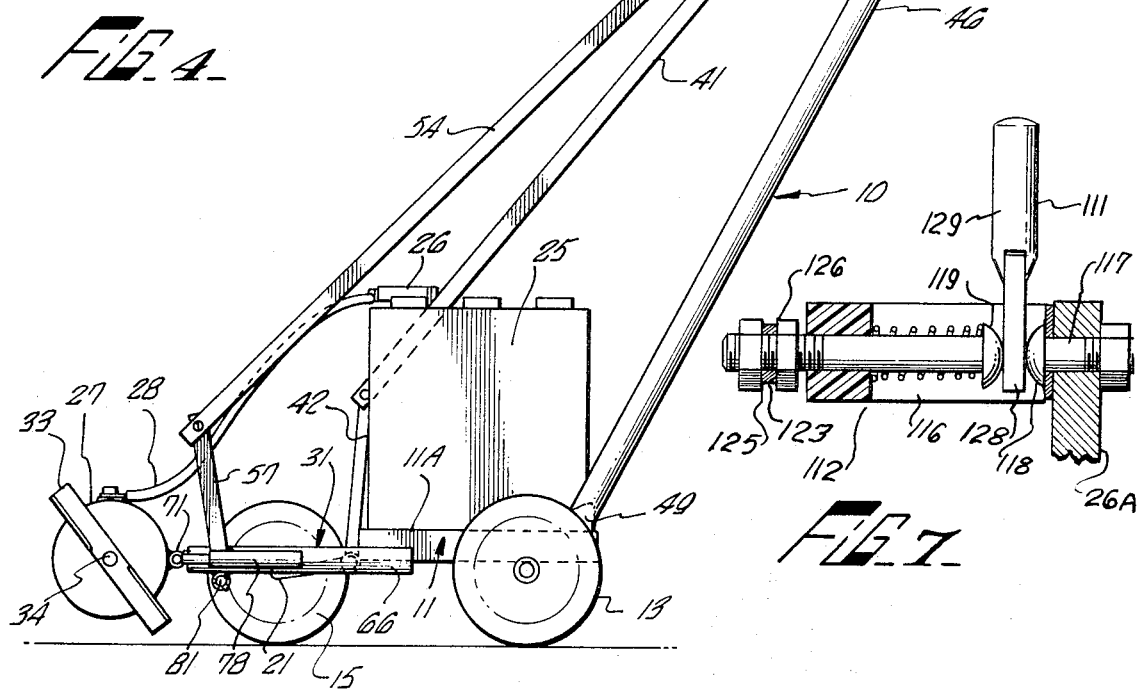

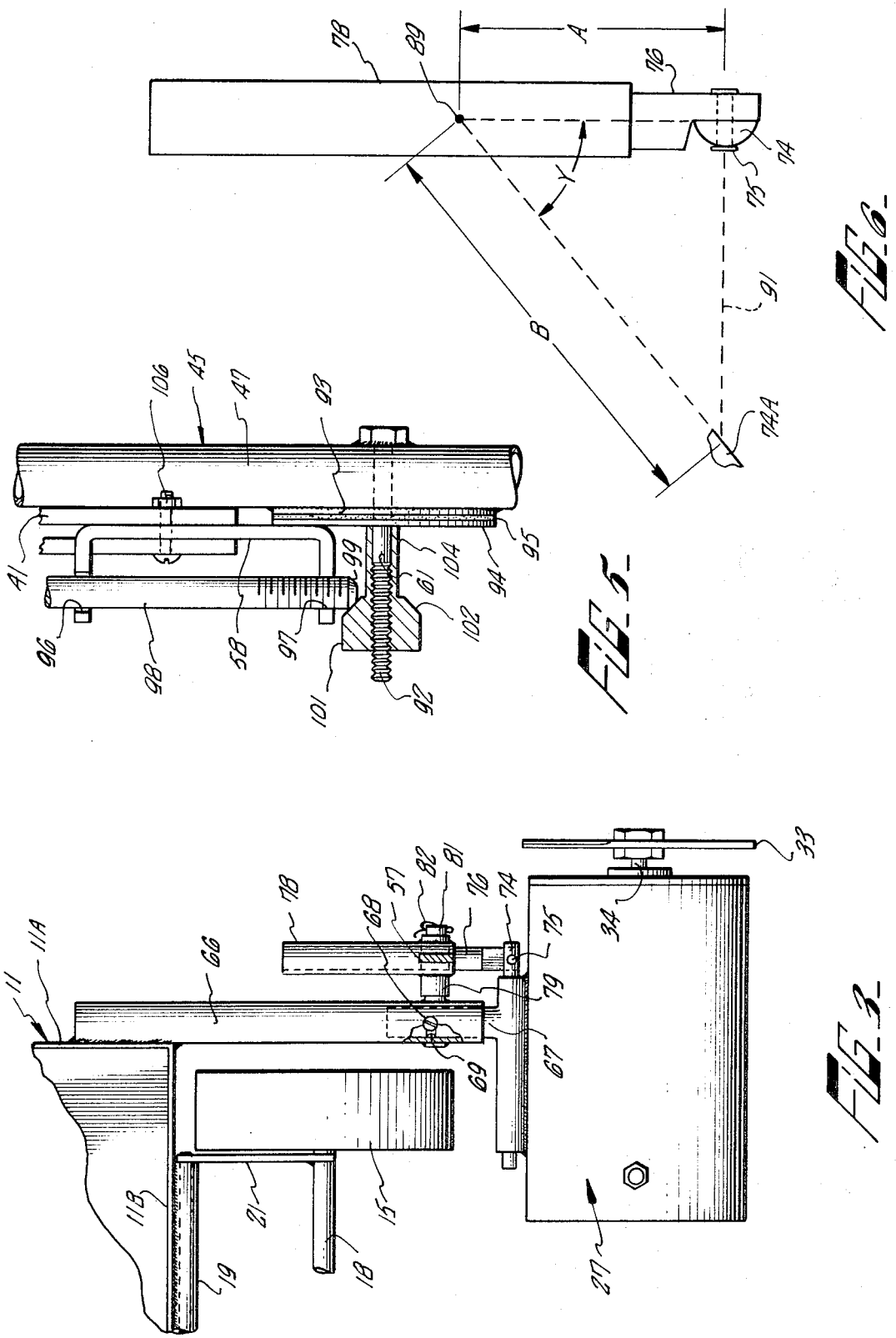

3,676,989

ELECTRIC GRASS EDGER

BACKGROUND OF THE INVENTION

The invention relates to electric-powered grass edgers or trimmers, and particularly to such edgers having a high-speed blade adjustable as to height and as to plane of rotation. Previous edgers, like those described in Dykes U.S. Pat. No. 3,090,186 issued May 21, 1963, and in Miller U.S. Pat. No. 2,691,264 issued Oct. 12, 1954, have been effective instruments but possessed of undesirable characteristics such as high initial cost, high maintenance cost and excessive weight, due in part to the extra elements for indirect blade drives.

Many similar apparatuses have been marketed and/or patented, but none is free from problems such as excessive weight, poor engine performance, extension cord damage and unresponsive controls. Most such machines have failed because of high maintenance costs resulting from mechanical over-complication.

I have invented a simple grass edger with an electrically powered cutting blade which is light in weight, has low initial cost, and is easily fabricated from presently commercially obtainable materials.

SUMMARY OF THE INVENTION

The invention contemplates, in a grass edger which has a frame with a pair of rear wheels and a pair of front wheels on an axle between support arms pivoted for motion with respect to the grass edger frame the combination including a carrier frame for an electric battery supported by the front and rear wheels and a pusher yoke rising rearwardly from the carrier frame. Height and attitude control levers are adjacent the top of the pusher yoke. The height control lever connects to the front wheel axle and a motor support sleeve extends forwardly from a fixed position on the carrier frame. A pivot arm journalled in the motor support sleeve terminates in a motor attachment sheath secured to an electric motor, preferably of a series-wound type. The motor shaft extends substantially perpendicular to the path of movement of the grass edger and carries a trimmer blade. A telescoping rod is slidable and rotatable in the attachment sheath. A tube pivotally fixed to the motor support sleeve at a distance therefrom houses a telescoping control shaft. The shaft is pivotally secured to an extending end of the telescoping rod. An elongate connector extends from the tube to the attitude control handle on the pusher yoke.

Preferably the control levers for both height and attitude are lockable at the chosen position. One means of locking is to bind together clutch discs by means of a wedge driven against a disc by a threaded control handle. The control handle in each instance rotates about the axis of the clutch discs. The motor is of a series-wound DC type to provide power and speed sufficient to eliminate gearing and other intermediate elements between motor and blade. Key means complete connection electrically from motor to power.

The objects of the invention are as follows:

To provide an electric grass edger of light weight and positive controls having a directly driven trimmer blade.

To provide such an edger wherein both blade height and blade attitude are responsive to similar controls.

To provide an electrically powered lawn edger wherein the motor and blade support comprises a plurality of tubes and telescoping shafts within the tubes linked to form a secure articulated support assembly for the motor and blade. These objectives are obtained in the inventive apparatus whose further advantages are evident from the following detailed description and drawing.

BRIEF DESCRIPTION OF THE DRAWING

FIG. 1 is a side elevation of the edger of the invention;
FIG. 2 is a plan view thereof;
FIG. 3 is a fragmentary plan view of the motor and blade support apparatus, partly broken away;
FIG. 4 is a fragmentary front elevation showing an alternate attitude of the motor and blade;
FIG. 5 is a fragmentary oblique view, partly in section, of a control handle in accordance with the invention;
FIG. 6 is a schematic diagram illustrative of the geometry of the motor support linkage; and
FIG. 7 is a fragmentary section of the key means.

DESCRIPTION OF THE PREFERRED EMBODIMENT

In FIGS. 1 and 2 an electric grass edger 10 has a rectangular base frame 11 supported by a pair of rear wheels 13, 14 and a pair of front wheels 15, 16. The front wheels are mounted to a transverse axle 18 supported from a tube 19 on front frame member 11B by parallel support arms 21, 22. A storage battery 25 with a keyed terminal 26 is supported upon frame 11 and supplies current to a D.C. motor 27 by means of a cable 28 (FIG. 1). Preferably the motor is a 6-volt series-wound motor. The motor and battery are suitably grounded to the frame and the circuit is closed through a motor support assembly 31 described in more detail with respect to FIG. 3.

In order to reduce weight and simplify maintenance, the inventive apparatus has no intervening belts and pulleys but has a trimmer blade 33 fixed to a motor shaft 34 to rotate therewith. Preferably the motor is a series-wound motor of high torque and speed such as the 6-volt starter motors once common in automobiles. Such a motor can directly drive a trimmer blade and obviate intermediate power transfer elements. Both electric motors and 6-volt batteries are obtainable in commercial quantities at reasonable prices.

It is necessary during operation to change the plane of rotation of the blade to suit different trimming operations and to change the height of the cut from time to time. The height of cut can be adjusted simply by raising the front part of the carriage and thus raising the motor and its trimmer blade. Preferably this is accomplished through articulation of the front wheel pair by means of a linking connector 41 from a height lever 42 fixed to the support arm 22 near its juncture with frame tube 19. The connector extends rearwardly to a height control handle 44 mounted to a pusher yoke 45 which has spaced arms 46, 47 and a transverse grip 48. Preferably the lower end 49 of each of the arms is rigidly fixed to side frame member 11A.

An attitude control handle 52 is attached to yoke arm 46 opposite height control handle 44. The control handles are substantially identical in operation, differing only in right and left hand orientation.

Attitude control handle 52 is linked to the motor support assembly 31 by a connector 54 which may comprise two metallic straps extending between a U-shaped control handle bracket 56 and a nearly upright attitude lever 57 attached to the motor support assembly. Similarly connector 41 may comprise a single solid bar notched at each end or two parallel metal straps extending between a U-shaped bracket 58 of control handle 44 and the previously described lever 42 attached to the arm 22 of axle 18.

Either control handle may be rotated about an axle 61 journalled in the yoke to displace the respective connector and change the position of the front wheels with respect to the frame or the tilt of the motor with respect to the horizontal.

FIGS. 1–3 illustrate the motor 27 and its trimmer blade 33 in a level attitude wherein the motor shaft is transversely horizontal and the trimmer blade is rotatable in a vertical plane. In FIG. 4 the motor and therefore the trimmer blade has been tilted such that its attitude with respect to the ground line 64 of FIG. 4 defines an acute angle, rather than being parallel to the ground line, as in the previously described Figures. Such a change in attitude is accomplished by a movement of handle 52 which imposes a change in position upon motor support assembly 31. The support assembly is a unique arrangement of sliding and pivoting rods within sleeves which achieves a change in the pitch of the blade without changing the transverse line of the motor shaft.

As can best be seen from FIG. 3, a motor support sleeve 66 is fixed as by welding to the side member 11A of frame 11. The forward projection of the support sleeve is substantially horizontal, although its angle with respect to the horizontal may change, depending upon the diameter of the wheels 15, 16 and the diameter of the trimmer blade.

A pivot arm 67 resides rotatably within tube 66. Its extension from the tube is controlled by a set screw 68 which engages a groove 69 in the pivot arm. The pivot arm terminates in a perpendicular attachment sheath 71 which is suitably secured to the outer housing 72 of the motor 27, as by welding. The attachment sheath is substantially parallel to the motor shaft 34.

A telescoping rod 74 is both slidable and rotatable within attachment sheath 71. A pivot pin 75 joins rod 74 to a sliding shaft 76 which is slidable within a tilt tube 78 to which attitude lever arm 57 is fixed.

Tilt tube 78 is in turn supported upon a bushing 79 which is restrained upon an axle 81 by a cotter key 82 or other suitable restrainer. The axle 81 is fixed beneath motor support tube 66 in a welded joint.

Tilt tube 78 and its shaft 76 are thus free to rotate about axle 81 under the influence of lever arm 57 which is linked to attitude control handle 52. As the control handle is rotated rearwardly or clockwise, as seen in FIG. 1, connector 41 displaces the upper portion of attitude lever arm 57 rearwardly, causing clockwise rotation of tube 78 about axle 81. Since contained shaft 76 is attached to telescoping rod 74, the rod is lifted under these conditions and imposes a turning moment upon attachment sheath 71 within support sleeve 66. Since the pivot arm 67 and its attachment sheath 71 are restrained from withdrawing from motor support tube 66, the rod 74 and the shaft 76 must displace within their respective housings to compensate for the change in the position of pivot pin 75 with respect to the pivot point of tube 78 about axle 81.

The geometry of this particular phase of operation is illustrated schematically in FIG. 6 wherein the pivot point of tube 78 is represented by the dot 84.

The telescoping rod 74 is represented as moving in an arc about the axis of pivot arm 67 (not shown) along the dotted line 91 of FIG. 6 to a position 74A. Shaft 76 is therefore displaced through the arc Y with respect to pivot point 84. Since the shaft and its housing tube 78 are constrained to movement about point 84 in a vertical plane, the distance of the pivot pin 75 with respect to point 84 must change, the length A of FIG. 6 being different from the length B of that Figure. Similarly, telescoping rod 74 is restrained to move in a vertical plane transverse to the plane of motion of shaft 76 and must therefore increase its extension from attachment sheath 71 to accommodate a change in attitude of the motor and trimmer blade, as lever arm 57 is displaced by connector 54. Obviously the extensions of shaft 76 and rod 74 must take place both when tube 78 is tilted upwardly or downwardly with respect to its normal horizontal alignment.

Despite displacement of the telescoping member 74 and 76 with respect to the sleeves, the substantially transverse attitude of the motor and drive shaft is maintained, so that the trimmer blade rotates substantially parallel to the path of advance of the grass edger.

In FIG. 5 the preferred combination of controlling elements is detailed. Yoke arm 47 supports a pivot 61 which extends outwardly of the yoke arm to terminate in a threaded end 92. A clutch disc 93 is fixed with respect to the yoke arm. A second clutch disc 94 which may have a friction face 95 adhered thereto is also concentrically mounted around a pivot 61 and secured to a U-shaped handle bracket 58.

One leg of the bracket has a clearance hold 96 and the other leg of the bracket has a threaded aperture 97 with which a control handle extension 98 is threadably engaged. The handle extension has a tapered end 99. A lock nut 101 has a frusto-conical face 102 against which the conical end 99 of the extension bears. A thrust sleeve 104 extends from the lock nut to clutch plate 94.

A bolt and nut assembly 106 secures a control connector, such as the connector 41, to the handle bracket 58 such that movement of the control handle arcuately about pivot 61 is communicated to the height or attitude lever arm of the edger. In the case of FIG. 5 connector 41 connects to the height lever arm 42.

In operation the embodiment of FIG. 5 is applicable to either height control handle 44 or attitude control handle 52. The lock nut 101 is adjusted on the threaded end 92 of pivot 61 to adjust the friction load between the clutch plates. The control handle is then rotated to engage or disengage from lock nut 101 in order to move or lock the control handle and its bracket 58 in position. Because the U-shaped bracket which supports the handle is fixed to the clutch plate 94 and the clutch plate is movable about the pivot 61, the control handle is maintained in an arcuate path about the pivot. The front to rear attitude of either the height lever arm or the attitude lever arm may thus be carefully calibrated by simple manipulation of either control handle.

The simple controls of the grass edger of the invention enable an operator to propel the grass edger along a desired path and to change both the height and attitude of the trimmer blade as the edger is propelled. The motor support assembly is responsive immediately to attitude changes, as is the front wheel assembly, to change the motor and blade heights.

By utilizing a self-contained electrical supply, such as a 6-volt storage battery, a series-wound electric motor can provide ample blade power and speed over a considerable length of time without the hazards or inconvenience of a trailing extension cord. The keyed terminal 26 is a further safeguard, precluding unauthorized operation without the bridging key 111 of FIG. 7. The terminal comprises the conventional battery post 26A and an insulation yoke 112. The yoke has a metallic plate 113 fixed across its legs 115, 116. A bolt 117 connects the plate to the post 26A. Bolt head 118 and the head 119 of a springloaded connector bolt 121 form the separated contacts of a switch between the battery and the motor.

The shank end of the connector bolt receives a connector loop 123 of the cable 28 between clamping nuts 125, 126. Nut 126 limits travel of connector bolt 121 in the yoke to separate its head 119 from bolt 117. The separation may be bridged by a key buss 128 to connect battery and motor electrically. The key is easily inserted and removed by its insulated handle 129.

The series-wound motor is easily reversed electrically, if desired, to enable the blade to handle varying trimming conditions. It is preferred that the motor rotate in a direction such that the blade bottom moves rearwardly with respect to the operator such that cutting tends to advance the edger. Suitable guards, which are not shown, may be provided about the cutter blade to catch cuttings without affecting the operation or substantially altering the weight of the apparatus.

While a U-shaped yoke has been shown as a handle for propelling the edger of the invention, handles of various configurations are not precluded from the scope of the invention, nor are self-propelling edgers. These and other modifications within the scope of the invention will occur to those skilled in this particular art. It is therefore desired that the invention be measured by the appended claims rather than by the illustrative embodiment described herein.

I claim:

1. In a grass edger having a frame with a rear wheel and a front wheel on a support arm pivoted for motion with respect to the grass edger frame, the combination comprising an electric battery carrier supported by the front and rear wheels, a pusher yoke rising rearwardly from the battery carrier, an attitude control handle on the yoke, a height-control handle adjacent the top of the pusher yoke and connected to the front wheel, a motor support sleeve extending forwardly from a fixed position on the battery carrier, a pivot arm journalled in the motor support sleeve, a motor attachment sheath on the arm, an electric motor with a drive shaft and secured to the attachment sheath such that the shaft of the motor extends substantially parallel to a vertical plane through the axis of the front wheel, a trimmer blade driven by the motor shaft, a rod slidable in the attachment sheath, a shaft pivotally secured to an extending end of the rod, a tube slidably receiving the shaft so as to support the shaft, said tube being parallel to but displaced from the motor support sleeve, a pivot supporting the tube with respect to the support sleeve, and connector means linking the tube to the upper end of the pusher-yoke.

2. An edger in accordance with claim 1 further comprising means for securing each control handle in a selected control position.

3. An edger in accordance with claim 2 wherein the securing means comprises a pivot on the yoke for each control handle, a clutch plate fixed with respect to the yoke, a clutch plate fixed with respect to the handle, and handle means for impinging one clutch plate on the other.

4. An edger in accordance with claim 3 wherein the handle comprises a hand grip, a bracket fixed to the clutch plate, a handle shank threadably engaged in the bracket, and a wedge tip on the shank adapted to apply force to the clutch plate.

5. An edger in accordance with claim 1 further comprising a battery having a terminal, an electrical connector to the motor separated from the electrical contact, and a conductive key removably held between electrical connector and terminal contact.

6. In a grass edger having a frame with a rear wheel and a front wheel on a support arm pivoted for motion with respect to the grass edger frame, the combination comprising an electric battery carrier supported by the front and rear wheels, a pusher yoke rising rearwardly from the battery carrier, an attitude-control handle on the yoke, means for securing said control handle in a selected control position, a height-control handle on the yoke, means for securing said height-control handle in a selected control position, means connecting the height-control handle to the front wheel; a motor support sleeve extending forwardly from the battery carrier, an electric motor with a drive shaft, articulated means securing the motor to the support sleeve such that the drive shaft extends substantially transversely to the plane of rotation of the front wheel, a trimmer blade driven by the motor shaft, a control connector extending from the articulated means to the attitude-control handle, each of said means for securing each of said control handles including a pivot on the yoke for each control handle, a clutch plate fixed with respect to the yoke, a clutch plate fixed with respect to the handle, and handle means for impinging one clutch plate on the other.

* * * * *